United States Patent
Ekstein et al.

(10) Patent No.: US 10,935,704 B2
(45) Date of Patent: Mar. 2, 2021

(54) SUBSTRATE FOR AN EUV-LITHOGRAPHY MIRROR

(71) Applicant: Carl Zeiss SMT GmbH, Oberkochen (DE)

(72) Inventors: Claudia Ekstein, Ellwangen (DE); Holger Maltor, Aalen (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 370 days.

(21) Appl. No.: 15/399,495

(22) Filed: Jan. 5, 2017

(65) Prior Publication Data

US 2017/0160447 A1 Jun. 8, 2017

Related U.S. Application Data

(60) Division of application No. 13/946,516, filed on Jul. 19, 2013, now abandoned, which is a continuation of
(Continued)

(30) Foreign Application Priority Data

Jan. 21, 2011 (DE) ...................... 10 2011 002 953.2

(51) Int. Cl.
*G02B 5/08* (2006.01)
*C22C 9/00* (2006.01)
(Continued)

(52) U.S. Cl.
CPC .............. *G02B 5/0891* (2013.01); *C22C 1/05* (2013.01); *C22C 1/051* (2013.01); *C22C 9/00* (2013.01);
(Continued)

(58) Field of Classification Search
CPC .......... G02B 5/08; G02B 5/0891; C22C 1/05; C22C 9/00; C22C 21/00; C22C 1/051; C22C 14/00
(Continued)

(56) References Cited

U.S. PATENT DOCUMENTS 4,093,349 A 6/1978 Mills
4,482,209 A 11/1984 Grewal et al.
(Continued)

FOREIGN PATENT DOCUMENTS

CN 1580832 A 2/2005
DE 10134267 A1 2/2003
(Continued)

OTHER PUBLICATIONS

Office Action in Corresponding Chinese Application 201280006089.1, dated Apr. 21, 2015; along with an English translation.
(Continued)

*Primary Examiner* — Ricky D Shafer
(74) *Attorney, Agent, or Firm* — Edell, Shapiro & Finnan, LLC (57) ABSTRACT

Substrates suitable for mirrors used at wavelengths in the EUV wavelength range have substrates (1) including a base body (2) made of a precipitation-hardened alloy, of an intermetallic phase of an alloy system, of a particulate composite or of an alloy having a composition which, in the phase diagram of the corresponding alloy system, lies in a region which is bounded by phase stability lines. Preferably, the base body (2) is made of a precipitation-hardened copper or aluminum alloy. A highly reflective layer (6) is preferably provided on a polishing layer (3) of the substrate (1) of the EUV mirror (5).

10 Claims, 3 Drawing Sheets

Related U.S. Application Data application No. PCT/EP2012/050533, filed on Jan. 14, 2012.

(60) Provisional application No. 61/434,869, filed on Jan. 21, 2011.

(51) Int. Cl.

| | | |
|---|---|---|
| *C22C 32/00* | (2006.01) | |
| *C22C 21/00* | (2006.01) | |
| *C22C 29/00* | (2006.01) | |
| *C22C 1/05* | (2006.01) | |
| *C22C 14/00* | (2006.01) | |
| *C22C 21/12* | (2006.01) | |
| *G21K 1/06* | (2006.01) | |

(52) U.S. Cl.
CPC .............. *C22C 14/00* (2013.01); *C22C 21/00* (2013.01); *C22C 21/12* (2013.01); *C22C 29/00* (2013.01); *C22C 32/0015* (2013.01); *C22C 32/0047* (2013.01); *C22C 32/0084* (2013.01); *G21K 1/062* (2013.01); *Y10T 428/31678* (2015.04)

(58) Field of Classification Search
USPC .................................................. 359/838, 883
See application file for complete search history.

(56) References Cited

U.S. PATENT DOCUMENTS

| | | | | |
|---|---|---|---|---|
| 4,643,543 | A * | 2/1987 | Mohn ....................... | G02B 5/08 359/846 |
| 4,659,548 | A * | 4/1987 | Gubbay ................. | B22F 1/0003 359/883 |
| 4,755,221 | A * | 7/1988 | Paliwal ................. | B22F 1/0048 419/12 |
| 4,803,334 | A * | 2/1989 | Burke .................... | B23K 26/18 219/121.64 |
| 5,699,188 | A | 12/1997 | Gilbert et al. | |
| 5,919,561 | A | 7/1999 | Fuchs et al. | |
| 6,183,877 | B1 * | 2/2001 | Bell ....................... | C22C 1/1036 148/439 |
| 6,377,655 | B1 | 4/2002 | Murakami et al. | |
| 6,587,263 | B1 | 7/2003 | Iacovangelo et al. | |
| 6,916,101 | B2 | 7/2005 | Yanagi et al. | |
| 8,342,701 | B2 * | 1/2013 | Kierey .................. | G02B 7/1815 359/845 |
| 8,343,394 | B2 * | 1/2013 | Parker .................... | C01F 7/027 264/15 |
| 8,976,927 | B2 * | 3/2015 | Ekstein ................ | G02B 5/0891 378/34 |
| 2001/0024323 | A1 | 9/2001 | Yanagi et al. | |
| 2003/0016784 | A1 | 1/2003 | Michaelsen et al. | |
| 2004/0165296 | A1 * | 8/2004 | Schaefer .............. | G02B 5/0808 359/883 |
| 2008/0163922 | A1 | 7/2008 | Horne et al. | |
| 2008/0289958 | A1 | 11/2008 | Kardokus et al. | |
| 2009/0011211 | A1 * | 1/2009 | Weinstein .............. | B22D 19/14 428/220 |
| 2009/0148334 | A1 * | 6/2009 | Stephenson ........... | C22C 1/1084 419/10 |
| 2011/0255068 | A1 | 10/2011 | Kools | |
| 2012/0044473 | A1 * | 2/2012 | Lippert ............... | G03F 7/70316 355/66 |
| 2013/0057952 | A1 * | 3/2013 | Risse .................... | C23C 14/083 359/360 |
| 2013/0301151 | A1 * | 11/2013 | Ekstein ..................... | C22C 9/00 359/838 |
| 2019/0212654 | A1 * | 7/2019 | Eva ......................... | C22C 49/06 |

FOREIGN PATENT DOCUMENTS

| | | | |
|---|---|---|---|
| DE | 102005026418 | A1 | 12/2006 |
| EP | 0725157 | A1 | 8/1996 |
| ES | 2028537 | A6 | 7/1992 |
| JP | 62180301 | A | 8/1987 |
| JP | 01303404 | A | 12/1989 |
| JP | H05346497 | A | 12/1993 |
| JP | H06279897 | A | 10/1994 |
| JP | H1090505 | A | 4/1998 |
| JP | 2006190862 | A | 7/2006 |
| JP | 2006518883 | A | 8/2006 |

OTHER PUBLICATIONS

Office Action in Corresponding German Application 10 2011 002 953.2, dated Oct. 14, 2011; along with an English translation.

English Office Action in corresponding Japanese Application No. 2013-549778, dated Dec. 22, 2015, along with an English translation.

Farrell, K., "Assessment of Aluminum Structural Materials for Service within the ANS Reflector Vessel", Oak Ridge National Laboratory, Aug. 1995.

English Office Action in corresponding Chinese Application No. 201280006089.1, dated Nov. 15, 2014, along with an English translation.

International Search Report in corresponding International Application No. PCT/EP2012/05033, dated Aug. 20, 2012.

Daly, E., "Mechanical design of the HER Synchrotron Light Monitor Primary Mirror for the PEP-II-B Factory", IEEE 1998.

Office Action in corresponding European Application 12702447.9, dated Jun. 12, 2017.

Office Action in corresponding Chinese Application 2015108709294, dated Mar. 9, 2018, along with English Translation.

Office Action in corresponding Korean Application 1020137021852, dated Mar. 27, 2018, along with English Translation.

Daly et al., "Mechanical Design of the Her Synchrotron Light Monitor Primary Mirror for the PEP-II B-Factory", Accelerator Conference 1997, Proceedings vol. 2, pp. 2014-2016.

KR Intellectual Property Trial and Appeal Board 4th Division Decision, KR 2013-7021852, Oct. 28, 2019, 29 pages.

KIPO Notice of Preliminary Rejection, KR Patent Application No. 10-2013-7021852, Nov. 7, 2019, 4 pages.

European Search Report, EP18207117, dated Apr. 11, 2019, 9 pages.

Geiger, "Metal Matrix Composite Foam: A new material for sandwich-construction mirrors", Advances in Optical Structure Systems, Bellingham Spie, vol. 1303, Apr. 16, 1990, pp. 546-553.

Guo et al., "Stress analysis at the interface between Ni—P coating and SiCp/Al substrate of space mi", Applied Surface Science, vol. 255, No. 6, Oct. 17, 2008, pp. 3691-3695.

Zhang et al., "Large-scale fabrication of lightweight Si/SiC ceramic composite optical mirror", Materials Letter, Elsevier, vol. 58, No. 7-8, Mar. 1, 2004, pp. 1204-1208.

\* cited by examiner

SUBSTRATE FOR AN EUV-LITHOGRAPHY MIRROR

This application is a divisional of U.S. patent application Ser. No. 13/946,516, filed Jul. 19, 2013, which is a continuation of International Application No. PCT/EP2012/050533, filed on Jan. 14, 2012, German Patent Application No. 10 2011 002 953.2, filed on Jan. 21, 2011, and U.S. Provisional Application No. 61/434,869, also filed on Jan. 21, 2011, the entire disclosures of which are incorporated herein by reference in their entireties.

FIELD OF AND BACKGROUND OF THE INVENTION

The present invention relates to a substrate for a mirror for Extreme-Ultraviolet (EUV) lithography comprising a base body and also to a mirror for an EUV projection exposure apparatus comprising such a substrate.

In order to make it possible to create ever finer structures using lithographic methods during the production of semiconductor components, for example, use is made of light having an ever shorter wavelength. If light in the extreme ultraviolet (EUV) wavelength range is used, for instance at wavelengths of between about 5 nm and 20 nm, it is no longer possible to use lens-like elements in transmission, but instead illumination and projection objectives are fashioned from mirror elements with highly reflective coatings which are adapted to the respective operating wavelength. In contrast to mirrors in the visible and ultraviolet wavelength ranges, it is also the case in theory that maximum reflectivities only of less than 80% can be achieved per mirror. Since EUV projective devices generally have a plurality of mirrors, it is necessary for each of these to have the highest possible reflectivity in order to ensure sufficiently high overall reflectivity.

In order both to keep losses in intensity as a result of stray radiation as low as possible and to avoid imaging aberrations, mirror substrates or mirrors which are produced by applying a highly reflective layer to the mirror substrate should have the lowest possible microroughness. The root mean squared (RMS) roughness is calculated from the mean value of the squares of the deviation of the measured points over the surface with respect to a central area, which is laid through the surface such that the sum of the deviations with respect to the central area is minimal. Particularly for optical elements for EUV lithography, the roughness in a spatial frequency range of 0.1 µm to 200 µm is particularly important for avoiding negative influences on the optical properties of the optical elements.

OBJECTS AND SUMMARY OF THE INVENTION

It is an object of the present invention to provide mirror substrates which are suitable as substrates for mirrors used at wavelengths in the EUV wavelength range.

This object is achieved, according to one aspect, by a substrate for a mirror for EUV lithography comprising a base body, characterized in that the base body is made of a precipitation-hardened alloy, preferably a precipitation-hardened copper or aluminum alloy.

During the precipitation hardening, an alloy is subjected to heat treatment in order to increase the hardening strength thereof. During the heat treatment, metastable phases are precipitated in finely distributed form such that they form an effective obstacle to dislocation movements. As a result, the long-term stability or within certain limits the temperature stability of the structure of the base body can be increased further. The precipitation hardening is usually carried out in three steps. In a first step, which is also referred to as solution annealing, the alloy is heated until all the elements which are needed for precipitation are present in solution. In order to obtain the purest possible distribution of the mixed phase, the temperature should be chosen to be very high, but not so high that individual constituents of the microstructure melt. After the solution annealing, quenching can prevent fusion and thus precipitation of coarse particles. The solid solution remains in a metastable, supersaturated single-phase state. By subsequent heating to temperatures which are low compared to the solution annealing, the supersaturated single-phase solid solution is converted into a two-phase alloy. The phase which is predominantly cohesive and generally arises in a higher proportion is called matrix, and the other phase is called precipitation. Since many nuclei were formed during the preceding quenching, many small precipitations which are distributed homogeneously in the microstructure and increase the structural strength are formed. It is advantageous for substrates and mirrors on the basis of a base body made of precipitation-hardened alloys to be used at temperatures which lie considerably below the solution annealing temperature, preferably below the precipitation temperature.

In a further aspect, the object is achieved by a substrate for a mirror for EUV lithography comprising a base body, wherein the base body is made of an alloy having a composition which, in the phase diagram, lies in a region which is bounded by phase stability lines. Alloys having such compositions have the advantage that any segregation processes can be stopped entirely by heat treatments, and therefore said alloys then have an increased high-temperature strength. This substrate has an increased long-term stability, as a result of which it is possible to ensure that the roughness values change as little as possible throughout the service life of an EUV projection exposure apparatus comprising mirrors based on this substrate. Particularly in the case of mirrors which are arranged further to the rear in the beam path, for example in the projection system, where they are exposed to lower thermal loading, it is possible to ensure that the roughness values remain constant over long periods of time.

The alloy is preferably an alloy with a substitution lattice. In the case of substitution lattices, alloying components having a relatively low concentration are incorporated into the lattice structure of the component having the highest concentration, such that the lattice strength is further increased. This increases the structural stability given an increase in temperature and in particular over long periods of time.

It is particularly preferable for the alloy to be precipitation-hardened. During the precipitation hardening, an alloy is subjected to heat treatment in order to increase the hardening strength thereof. During the heat treatment, metastable phases are precipitated in finely distributed form such that they form an effective obstacle to dislocation movements. As a result, the long-term stability or within certain limits the temperature stability of the structure of the base body can be increased further. The precipitation hardening is usually carried out in three steps. In a first step, which is also referred to as solution annealing, the alloy is heated until all the elements which are needed for precipitation are present in solution. In order to obtain the purest possible distribution of the mixed phase, the temperature should be chosen to be very high, but not so high that individual constituents of the microstructure melt. After the solution annealing, quenching can prevent fusion and thus precipitation of coarse particles. The solid solution remains in a metastable, supersaturated single-phase state. By subsequent heating to temperatures which are low compared to the solution annealing, the supersaturated single-phase solid solution is converted into a two-phase alloy. The phase which is predominantly cohesive and generally arises in a higher proportion is called matrix, and the other phase is called precipitation. Since many nuclei were formed during the preceding quenching, many small precipitations which are distributed homogeneously in the microstructure and increase the structural strength are formed. It is advantageous for substrates and mirrors on the basis of a base body made of precipitation-hardened alloys to be used at temperatures which lie considerably below the solution annealing temperature, preferably below the precipitation temperature.

In particularly preferred embodiments, the alloy is a copper alloy or an aluminum alloy, very particularly preferably a precipitation-hardened copper alloy. Copper alloys in particular can be readily cooled, and it is therefore possible to ensure that the operating temperature during the EUV lithography is sufficiently low, in particular in the case of precipitation-hardened alloys, in order to be able to prevent structural changes. In addition, it is possible to obtain high strengths both in the case of copper alloys and in the case of aluminum alloys even at temperatures considerably above room temperature.

In a further aspect, the object is achieved by a substrate for a mirror for EUV lithography comprising a base body, wherein the base body is made of a particulate composite. Particulate composites likewise have a high strength or structural stability. As a result, they are likewise highly suitable for use in mirror substrates for EUV lithography, in particular for long-term applications. Particulate composites have dispersoids which are insoluble in a matrix. It is preferable for the dispersoids to be made of ceramic material, in particular of oxides, carbides, nitrides and/or borides. In a manner similar to the precipitations in the precipitation hardening, the dispersoids form obstacles for dislocation movements within a matrix, in particular when they are present in finely distributed form.

It is preferable for the particulate composite to have spheroidal dispersoids. It is thereby possible to reduce the stress or distortion energy in the particulate composite, which can lead to a higher high-temperature strength. Dispersoids having a spheroidal geometry can be obtained by particular soft-annealing processes. By way of example, it is possible to carry out soft-annealing processes in which the material is held for one to two hours at a temperature at which the basic phase of the matrix of the particulate composite is stable, whereas other phases in solutions go just into solution. Then, the temperature of the material is fluctuated repeatedly around this temperature range, and subsequently the material is slowly cooled at about 10° C. to 20° C. per hour. Such temperature treatments can be carried out with the alloys described above such that any precipitations are spheroidized, in particular in the case of precipitation-hardened alloys.

It has proved to be particularly advantageous for the particulate composite to have dispersoids of an extent of between 1 nm and 20 nm. It is thereby possible to achieve particularly good strengths and at the same time to minimize a negative influence on microroughness values.

In preferred embodiments, the particulate composite has a metallic matrix, this particularly preferably being a copper matrix or an aluminum matrix. Examples of suitable dispersoids in this case are titanium carbide, aluminum oxide, silicon carbide, silicon oxide or carbon in a graphite or diamond modification.

In further preferred embodiments, the particulate composite has a ceramic matrix, in particular a silicon or carbon matrix. In this case, silicon carbide particles, in particular, have proved to be suitable as dispersoids.

In a further aspect, the object is achieved by a substrate for a mirror for EUV lithography comprising a base body, wherein the base body is made of an intermetallic phase of an alloy system.

Intermetallic phases are materials with a high strength and a high melting temperature. By way of example, they are used in aircraft engines or exhaust-gas turbochargers. In structural terms, the elementary cells of these special alloys have a high valence electron density. As a result, they have a covalent bond fraction which is high for metals and thereby have a particularly high lattice strength. It has been found that, in addition to a high specific strength and high melting temperatures, intermetallic phases overall have a high thermal stability with low diffusion coefficients and a high creep strength. These properties can ensure that, even under high thermal loading, as can occur for example in the case of mirrors which are arranged further forward in the beam path in an EUV projection exposure apparatus, in particular in the illumination system of an EUV projection exposure apparatus, the substrate experiences as little change as possible even over relatively long periods of time, and as a result properties such as the microroughness also remain as constant as possible.

It is advantageous for the base body to be made of an intermetallic phase in which the stoichiometric standard composition is observed. In other words, preference is given to intermetallic phases with a composition having integer indices. Particular preference is given to intermetallic phases having the smallest possible elementary cells. It is thereby possible to further reduce the probability of mixed phases arising as the temperature increases. As a result of the occurrence of appropriate precipitations, for example at grain boundaries, mixed phases of alloys having a differing structure could lead to an increase in microroughness, which could impair the optical quality of a mirror comprising such a substrate.

In particularly preferred embodiments, the base body is made of an intermetallic phase having a composition which corresponds to a phase stability line in the phase diagram of the corresponding alloy system. In this context, a "phase stability line" is to be understood as meaning a phase boundary line which runs parallel to the temperature axis in the phase diagram. Such compositions have the major advantage that no segregation occurs as the temperatures increase. Particular preference is given to intermetallic phases on a phase stability line which have no phase transition up to the melting point. The fewer the phase transitions which lie in particular in temperature ranges which can occur during use in EUV projection exposure apparatuses, and the more parallel the phase boundary line runs in relation to the temperature axis, the lesser the probability of the microroughness being adversely affected under the influence of thermal loading as a result of structural changes in the base body of the substrate.

It is particularly preferable for the base body to be made of an alloy having a composition which, in the phase diagram, lies in a region which is bounded by phase stability lines. Alloys having such compositions have the advantage that any segregation processes can be stopped entirely by heat treatments, and therefore said alloys then have an increased high-temperature strength.

It is advantageous that the intermetallic phase has the same Bravais lattice as the components thereof in crystalline form. As a result, it is possible to achieve a particularly stable crystalline structure which can further reduce a structural change as the temperature increases and/or over long periods of time, such that the roughness values of a mirror for EUV lithography which is based on such a substrate remain as unimpaired as possible throughout the service life.

In particularly preferred embodiments, the alloy system is a binary alloy system, preferably with copper as one of the two components, particularly preferably a binary aluminum-copper system. Copper, in particular, has a high thermal conductivity. Substrates comprising a base body with a high copper fraction can thus be cooled particularly readily in order to thereby additionally prevent a structural change over the service life. On the basis of aluminum, it is possible to obtain high-strength materials which have a good dimensional stability. It should be pointed out that intermetallic phases of other alloy systems may also be suitable for mirror substrates for EUV lithography. In particular, intermetallic phases of ternary or quaternary alloy systems or alloy systems with five or more components may also be involved. In this context, it should be pointed out that real alloys always also have traces of impurities. Mention is made of components of an alloy system here only if the respective component has a marked influence on the phase diagram of the respective alloy system.

As a whole, it has proved to be advantageous in the case of the base body materials described here for the material of the base body to have a face-centered cubic lattice structure. It is thereby possible to further increase the structural strength compared to body-centered cubic structures, for example, and therefore face-centered cubic materials are particularly suitable for use over long periods of time and, if appropriate, at elevated temperatures.

It is particularly preferable that the material of the base body experiences no changes in microstructure in the event of changes in temperature from 20° C. to 150° C. over a period of time of 1 year. This temperature range includes those temperatures which are achieved when mirrors based on this substrate are used in an EUV projection exposure apparatus. Since the base body materials experience changes in structure only at temperatures of above 150° C., it is possible to reduce the influence which the structure of the base body has on the roughness values of the mirror substrate or of the mirror based thereon practically to zero. The changes in structure may involve a very wide variety of effects, for example the positional change of dislocations, oscillations of the atoms, instances of roughening, such as the so-called orange peel effect, or else segregation processes.

In preferred embodiments, a polishing layer is arranged on the base body. It is advantageous that an adhesion-promoter layer is arranged between the base body and the polishing layer.

Preferred polishing layers are, inter alia, layers which have been deposited without external current, for example nickel-phosphorus or nickel-boron layers. In this case, they can be present in a crystalline phase or in an X-ray-amorphous phase. In the case of nickel-phosphorus layers, preference is given to layers containing more than 11% by weight phosphorus. The layers can also be nickel-phosphorus alloy layers which also comprise one or two additional metals. The layers can likewise be nickel-phosphorus or nickel-boron dispersion layers which, if appropriate, likewise contain one or two additional metals. This also applies to nickel-boron layers. Furthermore, copper layers, quartz glass layers, amorphous or crystalline silicon layers, amorphous silicon carbide layers or else indium-tin oxide (ITO) layers have proved to be advantageous. All of these layers have the common feature that they can be polished to roughnesses of an RMS value of 5 angstroms or else considerably lower in particular in the spatial frequency range of between 10 nm and 1 μm. Using the base body materials described here, it is possible to observe a stability of the microroughness in the spatial frequency range of 10 nm to 250 μm even under thermal loading and in long-term operation, since base body materials which have no morphological surface degradation under these conditions are proposed. In particular, the microroughness is obtained on an angstrom scale in RMS values. In the spatial frequency range of 10 nm to 1 μm, the changes in roughness can lie in a region of less than 2.5 angstroms; in the spatial frequency range of 1 μm to 250 μm, it is possible to achieve a fluctuation of the roughness values of less than 3 angstroms.

Depending on the combination of the base body material and the polishing layer material, it can be advantageous to provide an adhesion-promoter layer between the base body and the polishing layer in order to achieve a good bond between the base body and the polishing layer.

In a further aspect, the object is achieved by a mirror for an EUV projection exposure apparatus, comprising a substrate as described above and a highly reflective layer on the substrate, in particular on a polishing layer.

The mirrors for EUV projection exposure apparatuses are distinguished by a structural strength which is high with regard to long operating periods even at elevated temperatures and therefore by approximately constant roughness values throughout the period of use. In this case, it is possible to achieve service lives of a number of years. The substrates mentioned here, in particular on the basis of a base body made of an intermetallic phase, of a precipitation-hardened copper alloy or of a particulate composite, are suitable in particular but not only for use in the illumination system of an EUV projection exposure apparatus, for example in the form of facet mirrors.

The features mentioned above and further features are apparent not only from the claims but also from the description and the drawings, wherein the individual features can in each case be realized by themselves or as a plurality in the form of subcombinations in an embodiment of the invention and in other fields and can constitute advantageous and inherently protectable embodiments.

BRIEF DESCRIPTION OF THE DRAWINGS

The present invention will be explained in more detail with reference to exemplary embodiments. In this respect, FIGS. 1A,B schematically show two variants of a substrate in section.

DETAILED DESCRIPTION OF PREFERRED EMBODIMENTS

Figure 1A:
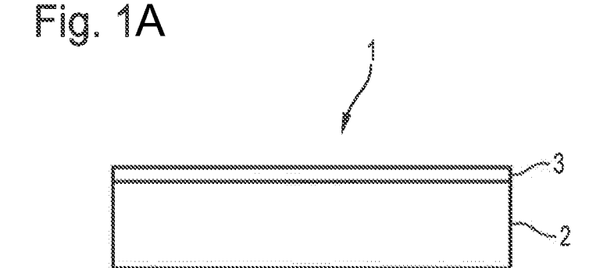

FIG. 1a schematically shows a first variant of an embodiment of a substrate 1 comprising a base body 2 and a polishing layer 3 applied thereto. The base body 2 and the polishing layer 3 perform different functions. Whereas a good dimensional stability is a priority for the base body 2, good machining and polishing properties are of primary importance for the polishing layer 3.

The polishing layer can be applied by conventional vacuum coating processes, for example sputtering processes, electron beam evaporation, molecular beam epitaxy or ion beam-assisted coating. If the polishing layer is a metallic material, for example copper, nickel-phosphorus or nickel-boron, it is preferably applied without external current. Nickel-phosphorus or nickel-boron polishing layers, in particular, can also be applied as dispersion layers, in which case polytetrafluoroethylene can serve as the dispersant, for example.

Nickel-phosphorus or nickel-boron polishing layers, in particular, are preferably applied with relatively high concentrations of phosphorus or boron, such that they are present predominantly or even completely in amorphous form and thereby have better polishing properties. They can then be hardened by, for example, heat treatment, plasma treatment or ion bombardment. Silicon as polishing layer material can also be deposited in amorphous or crystalline form in a manner controlled by the coating process. Amorphous silicon can be polished more effectively than crystalline silicon and, if required, can likewise be hardened by heat treatment, plasma treatment or ion bombardment. Polishing layers made of silicon or silicon dioxide can also be smoothed through use of ion beams. The polishing layer can also be made of silicon carbide or of indium-tin oxide.

Preferred thicknesses of the polishing layer 3 can be about 5 µm to 10 µm for metal-based, polished polishing layers. In the case of non-metallic polishing layers 3, preferred layer thicknesses are about 1.5 µm to 3 µm. Using conventional polishing processes, metallic polishing layers can be polished to root mean squared roughnesses of less than 0.3 nm in the spatial frequency range of 1 µm to 200 µm and to root mean squared roughnesses of less than 0.25 nm in the spatial frequency range of 0.01 µm to 1 µm. Using conventional polishing processes, non-metallic polishing layers can be polished to root mean squared roughnesses of less than 0.3 nm over the entire spatial frequency range of 0.01 µm to 200 µm.

Figure 1B:
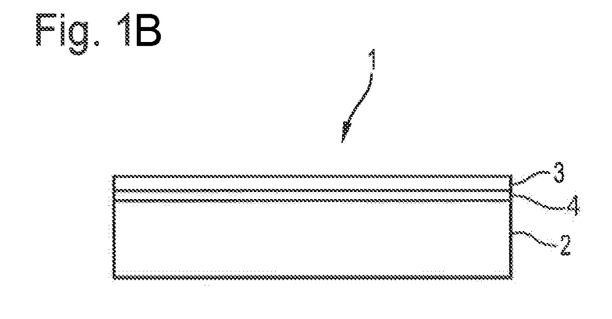

FIG. 1*b* schematically shows a variant of the substrate 1 shown in FIG. 1*a*, in which an adhesion-promoter layer 4 is arranged between the base body 2 and the polishing layer 3. It is preferable that the adhesion-promoter layer 4 can have a thickness of up to 1 µm, preferably of between 100 nm and 500 nm. By way of example, it can be applied using CVD (chemical vapor deposition) or PVD (physical vapor deposition) processes.

Figure 2A:
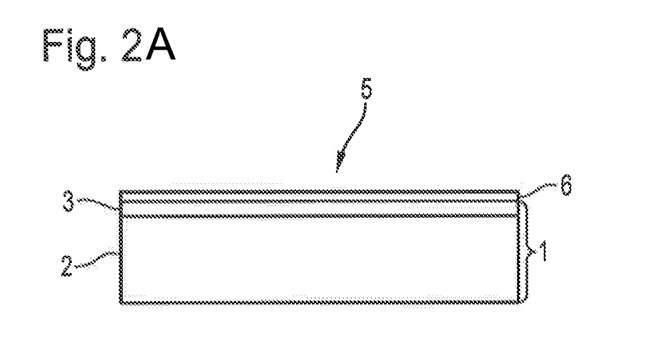
FIGS. 2A,B schematically show two variants of a mirror in section.

Such substrates 1 can be further processed to form EUV mirrors 5, as is shown schematically in FIG. 2*a* in a first variant of an embodiment, by applying a highly reflective layer 6 to the polishing layer 3. For use in the case of EUV radiation in the wavelength range of about 5 nm to 20 nm and with normal incidence of radiation, the highly reflective layer 6 is particularly preferably a multilayer system of alternating layers of material with a differing real part of the complex refractive index via which a crystal with network planes at which Bragg diffraction takes place is simulated to some extent. A multilayer system of alternating layers of silicon and molybdenum can be applied, for example, for use at 13 nm to 14 nm. Particularly if the highly reflective layer 6 is configured as a multilayer system, it is preferably applied using conventional vacuum coating processes such as, for example, sputtering processes, electron beam evaporation, molecular beam epitaxy or ion-beam-assisted coating. For use in the case of EUV radiation in the wavelength range of about 5 nm to 20 nm and with grazing incidence of radiation, preference is given to mirrors with an uppermost layer of metal, for example of ruthenium.

Figure 2B:
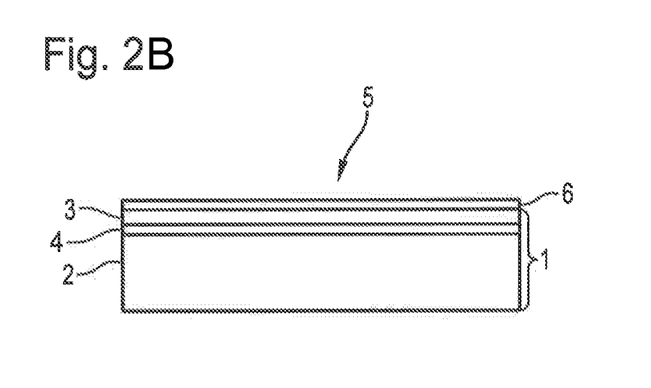

FIG. 2*b* schematically shows a further variant of the mirror 5 shown in FIG. 2*a*, in which an adhesion-promoter layer 4 is arranged between the base body 2 and the polishing layer 3 of the substrate 1 of the mirror 5.

In a first example, the base body 2 of the mirror 5 or of the substrate 1 can be made of a particulate composite. In particular, the base body 2 can be made of a particulate composite having a metallic matrix. By way of example, the latter can be a 2000 to 7000 series aluminum alloy, preferably a 5000 to 7000 series aluminum alloy, copper, a low-alloy copper alloy or copper niobate. The preferably spheroidal dispersoids of an extent in the range of 1 nm to 20 nm are advantageously titanium carbide, titanium oxide, aluminum oxide, silicon carbide, silicon oxide, graphite or diamond-like carbon, it also being possible for dispersoids of differing materials to be provided in the matrix. These materials can be produced by powder metallurgy, for example. The base body 2 can also be made of a particulate composite having a ceramic matrix. By way of example, particulate composites having a silicon or carbon matrix and silicon carbide dispersoids are particularly suitable. As a result of their covalent bond, they have a particularly high lattice rigidity. It is particularly preferable for the dispersoids to be distributed as homogeneously as possible in the matrix, for said dispersoids to be as small as possible and for the composite to have the smallest possible dispersoid spacings.

In a second example, the base body 2 can be made of an alloy having components which have similar atomic radii and have a structure with a substitution lattice. By way of example, this may be the alloy system copper-nickel or silicon-aluminum.

In a third example, the base body 2 can be made of a precipitation-hardened alloy. By way of example, it can be made of precipitation-hardened copper or aluminum alloys such as AlCu4Mg1, CuCr, CuNi1Si, CuCr1Zr, CuZr, CuCoBe, CuNiSi. In specific embodiments, the alloys were subjected to a further heat treatment after the precipitation hardening, this having the effect that the precipitations assume a spheroidal form in order to reduce stress or distortion energies in the material so as to further increase the high-temperature strength. To this end, the material is held for one to two hours at a temperature at which the basic phase of the matrix of the particulate composite is stable, whereas other phases in solutions go indeed into solution. Then, the temperature of the material is fluctuated repeatedly around this temperature range, and subsequently the material is slowly cooled at about 10° C. to 20° C. per hour.

Figure 3:
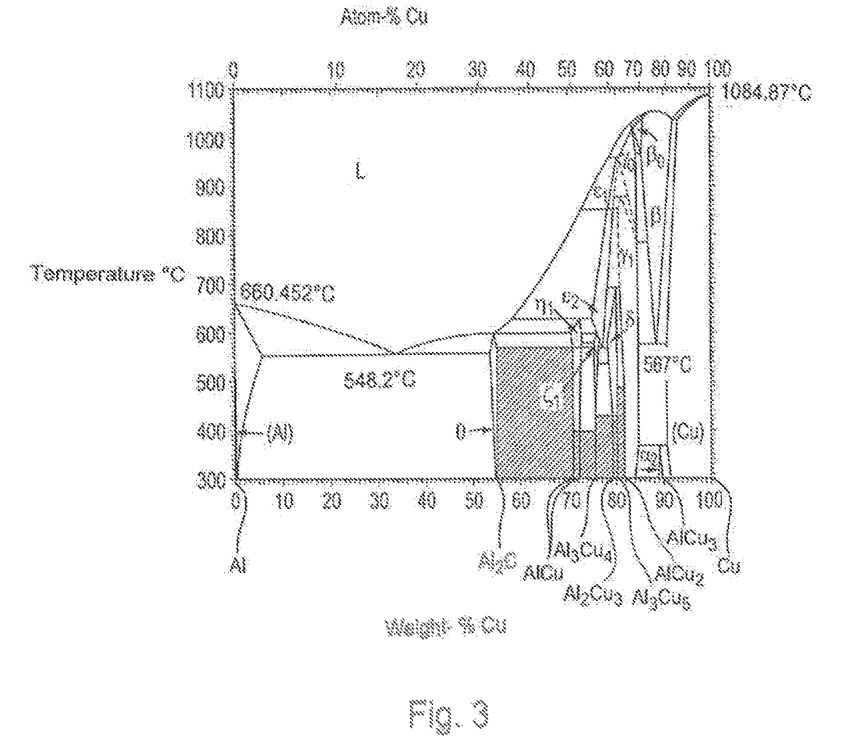
FIG. 3 shows a phase diagram for a binary aluminum-copper system.

In a fourth example, the base body 2 can be made of an intermetallic phase. FIG. 3 shows the phase diagram of a binary aluminum-copper system, the intermetallic phases of which are particularly suitable as the material of the base body 2. At 300° C., sixteen intermetallic phases of $Al_xCu_y$, where x, y are integers, are stable. Of these, ten intermetallic phases stay stable upon cooling to room temperature (not shown here). The most important phases are indicated in FIG. 3 with the stoichiometric composition thereof. All of them lie at phase boundary lines which run parallel to the temperature axis over a certain temperature range. As a result, the microstructure thereof remains completely unchanged in these respective temperature ranges. Particular preference is given to $Al_2Cu$, $Al_2Cu_3$ or $Al_3Cu_5$, inter alia, as the material of a base body of a mirror substrate for EUV lithography. In variations, it is also possible to use other binary alloy systems, one component of which is copper, for example binary systems of copper and zinc, tin, lanthanum, cerium, silicon or titanium.

In a fifth example, the base body 2 can also be made of an alloy having a composition which lies between two phase stability lines. These regions are shaded gray in FIG. 3. Since the precipitation processes have been stopped by heat treatments, these alloys are present in a thermally stable phase. In this respect, preference is given to compositions from particularly wide ranges, for instance between $Al_2Cu$ and AlCu.

The substrates of the examples mentioned here have particularly high strengths of 300 MPa or more, even at temperatures of up to 150° C., and also have a good long-term stability. The substrates, which comprise copper in the base body thereof, additionally have high thermal conductivities, and therefore they can be readily cooled. On account of their special base body, the substrates do not experience any changes in microstructure in temperature ranges which arise in long-term operation of mirrors in EUV projection exposure apparatuses. As a result, EUV mirrors having such a substrate have the advantage that the roughness values thereof remain substantially constant over their service life, in particular in the spatial frequency range of 0.1 µm to 200 µm. The EUV mirrors described here are suitable both for use in the illumination system, with which a mask or a reticle is illuminated with EUV radiation, and in the projection system, with which the structure of the mask or of the reticle is projected onto an object to be exposed, for example a semiconductor wafer, of an EUV projection exposure apparatus. Owing to their high-temperature strength and resilience, they are particularly suitable for mirrors arranged further forward in the beam path, where the thermal loading is higher, for instance in the illumination system. They are particularly suitable for use as facets of pupil facet mirrors and particularly of field facet mirrors.

The above description of the specific embodiments has been given by way of example. From the disclosure given, those skilled in the art will not only understand the present invention and its attendant advantages, but will also find apparent various changes and modifications to the structures disclosed. The applicant seeks, therefore, to cover all such changes and modifications as fall within the spirit and scope of the invention, as defined by the appended claims, and equivalents thereof.

The invention claimed is:

1. A mirror for Extreme Ultraviolet (EUV) lithography comprising:
   a base body consisting essentially of a particulate composite, wherein the particulate composite comprises dispersoids dispersed in a matrix in which the dispersoids are insoluble, wherein the matrix comprises a metallic copper matrix;
   a polishing layer arranged on the base body; and
   a reflective layer configured to reflect EUV radiation arranged on the polishing layer.

2. The mirror according to claim 1, wherein the dispersoids have an extent of between 1 nm and 20 nm.

3. The mirror according to claim 1, wherein the dispersoids comprise spheroidal dispersoids.

4. The mirror according to claim 1, wherein the dispersoids comprise titanium oxide particles.

5. The mirror according to claim 1, wherein the dispersoids comprise silicon oxide particles.

6. The mirror according to claim 1, wherein the dispersoids comprise graphite particles.

7. The mirror according to claim 1, wherein the dispersoids comprise diamond-like carbon particles.

8. The mirror according to claim 1, wherein the reflective layer comprises a multilayer system of alternating layers of high index of refraction layers and low index of refraction layers.

9. The mirror according to claim 1, wherein the reflective layer comprises a multilayer system of alternating layers of molybdenum and silicon.

10. The mirror according to claim 1, wherein the dispersoids comprise titanium carbide particles.

\* \* \* \* \*

UNITED STATES PATENT AND TRADEMARK OFFICE
CERTIFICATE OF CORRECTION

PATENT NO. : 10,935,704 B2
APPLICATION NO. : 15/399495
DATED : March 2, 2021
INVENTOR(S) : Ekstein et al.

Page 1 of 1

It is certified that error appears in the above-identified patent and that said Letters Patent is hereby corrected as shown below:

On the Title Page

Page 2, Column 2, under OTHER PUBLICATIONS, Line 38, delete "Elsievier," and insert -- Elsevier, --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*